(12) United States Patent
Iordache

(10) Patent No.: US 10,659,364 B2
(45) Date of Patent: May 19, 2020

(54) HYBRID AQM CONTROLLER USING RBF FOR QUEUE UTILIZATION APPROXIMATION AS A NON-LINEAR SYSTEM

(71) Applicant: NXP USA, Inc., Austin, TX (US)

(72) Inventor: Florinel Iordache, Bucharest (RO)

(73) Assignee: NXP USA, Inc., Austin, TX (US)

( * ) Notice: Subject to any disclaimer, the term of this patent is extended or adjusted under 35 U.S.C. 154(b) by 58 days.

(21) Appl. No.: 15/630,143

(22) Filed: Jun. 22, 2017

(65) Prior Publication Data

US 2018/0309676 A1 Oct. 25, 2018

(51) Int. Cl.
- *H04L 12/801* (2013.01)
- *H04L 12/835* (2013.01)
- *H04L 12/939* (2013.01)

(52) U.S. Cl.
CPC .............. *H04L 47/12* (2013.01); *H04L 47/29* (2013.01); *H04L 47/30* (2013.01); *H04L 49/555* (2013.01)

(58) Field of Classification Search
CPC ......... H04L 47/12; H04L 47/29; H04L 47/30; H04L 49/555
See application file for complete search history.

(56) References Cited

U.S. PATENT DOCUMENTS

| | | | | |
|---|---|---|---|---|
| 5,847,952 | A * | 12/1998 | Samad | G05B 13/027 700/48 |
| 6,901,593 | B2 * | 5/2005 | Aweya | H04L 47/10 370/230 |
| 7,280,477 | B2 * | 10/2007 | Jeffries | H04L 47/10 370/235 |
| 8,422,367 | B2 * | 4/2013 | Chen | H04L 47/10 370/229 |
| 9,246,829 | B2 * | 1/2016 | Pan | H04L 47/32 |
| 9,438,523 | B2 * | 9/2016 | Iordache | H04L 47/2441 |

(Continued)

FOREIGN PATENT DOCUMENTS

CN 101635674 B 1/2013

OTHER PUBLICATIONS

Mutlu Arpaci et al., An Adaptive Queue Management Method for Congestion Avoidance in TCP/IP Networks, IEEE Global Telecommunications Conference, Nov. 27-Dec. 1, 2000, pp. 309-315.

(Continued)

*Primary Examiner* — Alpus Hsu

(57) ABSTRACT

An adaptive hybrid control method and apparatus are provided for performing active queue management in a data packet routing device which adaptively combines fuzzy controller logic, alone or in combination with RBF-PID control logic, to provide improved management of network congestion by applying a nonlinear model for buffer utilization to at least a buffer size measure for the target buffer to generate at least a fuzzy membership function adjustment signal, and then supplying the fuzzy membership function adjustment signal to a first controller to automatically tune membership function parameters of the first controller, where the first controller calculates a first packet select probability value for the data packet based at least partly on the fuzzy membership function adjustment signal and an error measure between the buffer size setpoint and the buffer size measure.

20 Claims, 8 Drawing Sheets

(56) References Cited

U.S. PATENT DOCUMENTS

| | | | |
|---|---|---|---|
| 9,674,104 B1* | 6/2017 | Pan | H04L 47/50 |
| 9,686,201 B2* | 6/2017 | White | H04L 69/16 |
| 9,716,664 B2* | 7/2017 | Oran | H04L 47/283 |
| 10,218,620 B2* | 2/2019 | Mihaly | H04L 47/11 |
| 2015/0244639 A1 | 8/2015 | Iordache et al. | |
| 2016/0241435 A1 | 8/2016 | Iordache | |
| 2018/0054394 A1* | 2/2018 | De Schepper | H04L 47/566 |

OTHER PUBLICATIONS

Seyed Saeid Masoumzadeh et al., FQL-RED: Ad Adaptive Scalable Schema for Active Queue Management, International Journal of Network Management, Wiley Online Library, DOI: 10.1002/nem. 755, 2010.

Hamed Moradi Pour et al., Active Queue Management in TCP Networks Based on Fuzzy-Pid Controller, Global Journal of Computer Scence and Technology, vol. 10, Issue 9, Ver. 1.0, pp. 42-46, Sep. 2010.

Jingwei Xu et al., Design of Adaptive Fuzzy PID Tuner Using Optimization Method, Proceedings of the 5th World Congress on Intelligent Control and Automation, Jun. 15-19, 2004, Hangzhou, P.R. China, pp. 2454-2458.

Wang Jun-Song et al., RBF-PID Based Adaptive Active Queue Management Algorithm for TCP Network, 2007 IEEE International Conference on Control and Automation, May 30-Jun. 1, 2007, Guangzhou, China, pp. 171-176.

Frank Posluszny et al., An Adaptive Queue Management Method for Congestion Avoidance in TCP/IP Networks, Mar. 15, 2002, 31 pages.

\* cited by examiner

HYBRID AQM CONTROLLER USING RBF FOR QUEUE UTILIZATION APPROXIMATION AS A NON-LINEAR SYSTEM

BACKGROUND OF THE INVENTION

Field of the Invention

The present invention is directed in general to network communications. In one aspect, the present invention relates to a method, apparatus, system, and computer program product for controlling congestion in a communication network.

Description of the Related Art

As the usage of computer network and communication technology increases with increasing numbers of users, new services, and applications, there are increasingly serious network congestion problems which can lead to a serious decline in network performance in terms of higher packet loss rate, increased network transmission delay, link utilization decline, etc. To address these problems, congestion avoidance and control technology is used to control network communications in the network. For example, Internet routers may employ active queue management (AQM) techniques to enable the intelligent drop of network packets inside a buffer associated with a network interface controller (NIC) when that buffer becomes full or gets close to becoming full, often with the larger goal of reducing network congestion. Typically performed by the network scheduler, AQM techniques represent an improvement over conventional drop-tail techniques by arbitrarily reordering or dropping network packets inside the transmit buffer of a network interface controller. By dropping or marking packets probabilistically before the queue is full, AQM techniques are able to maintain shorter queue lengths than the conventional drop-tail techniques, helping to combat "buffer-bloat," reducing network latency, and having less of a tendency to penalize bursty flows whilst avoiding the problem of global synchronization. Over the years, a wide range of AQM algorithms have been developed, such as random early detection (RED), weighted random early detection (WRED), robust random early detection (RRED), adaptive random early detection (ARED), proportional-integral (PI), proportional-integral-derivative (PID), and radial basis function proportional-integral-derivative (RBF-PID), each representing an improvement over previous AQM techniques. For example, all PID-based algorithms are superior to all RED-based algorithms, with the RBF-PID algorithm having superior performance in terms of providing adapting to network dynamics since the RBF function has the ability to approximate nonlinear systems behavior which is the case of network traffic. However, even RBF-PID based AQM techniques have some drawbacks in terms of settling time and overshoot when used to control congestion over TCP communication networks. As a result, the existing solutions for managing congestion in communication networks are extremely difficult at a practical level in terms of managing network performance to reduce packet loss rate, decrease network transmission delay, improve link utilization rates, and more efficiently utilize network resources.

BRIEF DESCRIPTION OF THE DRAWINGS

The present invention may be understood, and its numerous objects, features and advantages obtained, when the following detailed description is considered in conjunction with the following drawings.

DETAILED DESCRIPTION

An adaptive hybrid control method and apparatus are disclosed for performing active queue management (AQM) to reduce network congestion by configuring a data packet routing device with a combination of fuzzy control logic and radial basis function proportional-integral-derivative (RBF-PID) control logic to provide improved performance for managing network congestion for nonlinear system behavior occurring in network traffic conditions, such as transmission control protocol (TCP) communication networks. In selected embodiments, the data packet routing device is configured to use the fuzzy control logic having an RBF-based adaptive layer to calculate a packet select probability when a computed error measure exceeds an error threshold, and is configured to use the RBF-PID control logic having an RBF-based adaptive layer to calculate a packet select probability when the computed error measure does not exceed the error threshold. While selected embodiments of the present disclosure are directed to a hybrid algorithm which adaptively combines RBF-PID and fuzzy control algorithms in a network router's AQM packet processing operations, the present disclosure is not limited to the specific examples herein described, and may be used with a variety of different AQM algorithms which monitor a queue length value and drop (or discard) packets based on a packet select probability calculated based on the queue length value. While selected embodiments may include a feedback mechanism of the underlying transport protocol based on (or compatible with) the dropping of packets resulting in a form of notification being fed back to the source of the packet that the packet has been dropped/discarded to thereby provide a form of congestion notification to the source of the packet, the present disclosure is not limited to being implemented in conjunction with such a feedback mechanism and may equally be implemented within networks based on transport protocols supporting alternative feedback mechanisms. For example, the present invention may be implemented within a network comprising a transport protocol that supports, say, Explicit Congestion Notification (ECN), whereby the AQM algorithm(s) may be arranged to mark a data packet in order to signal (impending) congestion, instead of dropping/discarding the data packet. Furthermore, because the illustrated embodiments of the present disclosure may be implemented in whole or in part using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
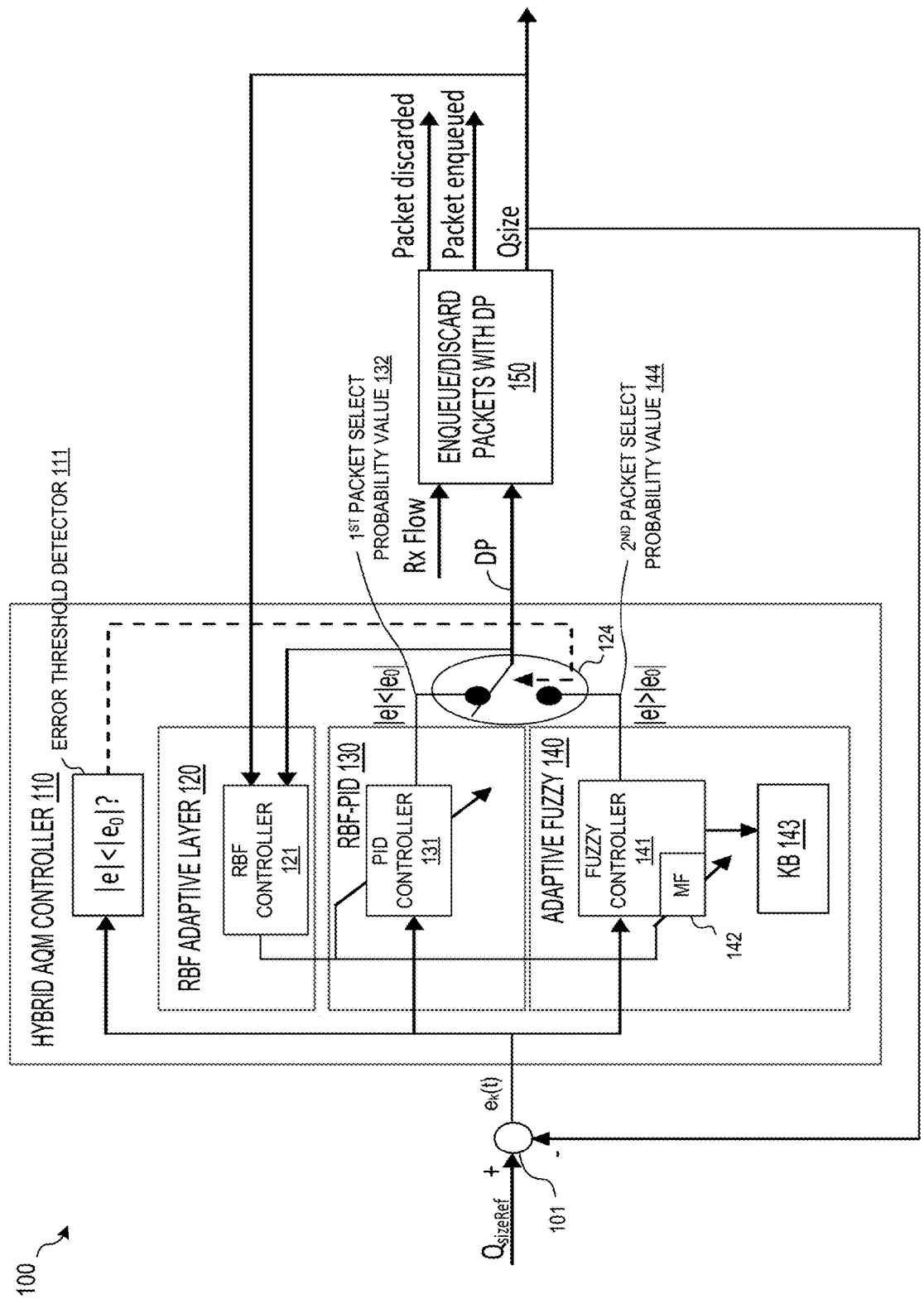
FIG. 1 illustrates a simplified architectural block diagram of a data packet routing device which employs a hybrid AQM controller in accordance with selected embodiments of the present disclosure.

Turning now to FIG. 1, there is shown a simplified architectural block diagram of a data packet routing device 100 in accordance with a first illustrative embodiment which employs a hybrid AQM controller 110 to adaptively combine RBF-PID control logic or module 130 with adaptive fuzzy controller logic or module 140 to manage network congestion by providing a select probability, or alternatively, dropping probability (DP) measure to control the packet transmit/drop circuit 150 which performs packet drop operations on the received incoming packet flow (Rx Flow). As depicted, the hybrid AQM controller 110 is connected to receive as inputs a queue size (Qsize) in feedback from the packet transmit/drop circuit 150 along with an error measure ($e_k(t)$), and to generate therefrom a dropping probability (DP) measure by providing an automatic queue size (Qsize) adjustment according to a configurable reference level (QsizeRef). To generate the error measure, a differential circuit 101 may be connected to receive the feedback queue size (Qsize) and a queue size setpoint or reference level (QsizeRef), and to compute therefrom the error measure ($e_k(t)$) that is provided as an input to an RBF-PID module 130 and adaptive fuzzy module 140. Additional control inputs to the RBF-PID module 130 and adaptive fuzzy module 140 are provided by the RBF adaptive layer 120 and RBF controller 121 which automatically adjusts input control values provided to the PID controller 131 of the RBF-PID module 130 and to the fuzzy controller 141 of the adaptive fuzzy module 140 in response to the queue size (Qsize) and the select/dropping probability (DP) output received at the RBF controller 121.

In particular, the RBF-PID module 130 uses a PID controller 131 to process the error measure ($e_k(t)$) based on one or more gain parameters (e.g., P, I, and D gain parameters) continuously adjusted according to traffic by the RBF adaptive layer 120, and to generate therefrom a first packet select probability output 132 which quantifies the probability of the packet being selected, or inversely, dropped or discarded. As used herein, the terms "select probability" and "dropping probability" (or a "discard probability") are alternative or equivalent and interchangeable ways of referring to the probability of a packet being discarded (e.g., dropped) or not (e.g., selected). In similar fashion, the fuzzy controller 141 in the adaptive fuzzy module 140 processes the error measure (ek(t)) using one or more membership functions (MF) 142 which are continuously adjusted according to traffic by the RBF adaptive layer 120 to access the set of rules stored in the knowledge base (KB) 143 when generating a second packet select probability output 144 which quantifies the probability of the packet being selected, or inversely, dropped or discarded. To select between the outputs 132, 144 generated by the RBF-PID module 130 and adaptive fuzzy module 140, the selector circuit or switch 124 is connected to be gated or controlled by an error threshold detection circuit 111 which evaluates the error measure (ek(t)) against a threshold measure (e0). In this configuration, the hybrid AQM controller 110 is configured to provide an automatic adjustment of the queue size (Qsize) that is close to the configurable reference level (QsizeRef) which can be used by the RBF-based adaptive layer 120 to adaptively select the RBF-PID module 130 to implement a PID control law for small errors (e.g., |e|<|e0|), and to select the adaptive fuzzy module 140 to implement a fuzzy control law for large errors (e.g., |e≡>|e0|). As a result, when configurable reference level (QsizeRef) is exceeded, hybrid AQM controller causes the packet transmit/drop circuit 150 to drop the frames, prompting the sender to slow down the frame transmission rate.

The data packet routing device 100 may be implemented in a network communication device, such as a network router or switch. However implemented, the hybrid AQM controller functionality disclosed herein may be embodied with one or more signal processing components arranged to execute computer program code stored within one or more memory elements comprising any suitable form of non-transitory computer program product, such as one or more of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory. Furthermore, since the data packet routing device 100 may be implemented at least in part using electronic components and circuits known to those skilled in the art, details will not be explained in any greater extent than that considered necessary for the understanding and appreciation of the underlying concepts of the present disclosure in order not to obfuscate or distract from the teachings herein. However arranged, the signal processing component(s) are configured and connected to execute active queue management computer program code that is operable to, upon receipt of an incoming data packet, determine a queue length value (Qsize) for a target buffer of the received incoming data packet by calculating a first packet select probability value using a PID controller and RBF adaptive layer, calculating a second packet select probability value using a fuzzy controller and RBF adaptive layer, and choosing between the first and second packet select probability values using selector circuit to automatically select the control law based on the amount of detected queue size error.

Figure 2:
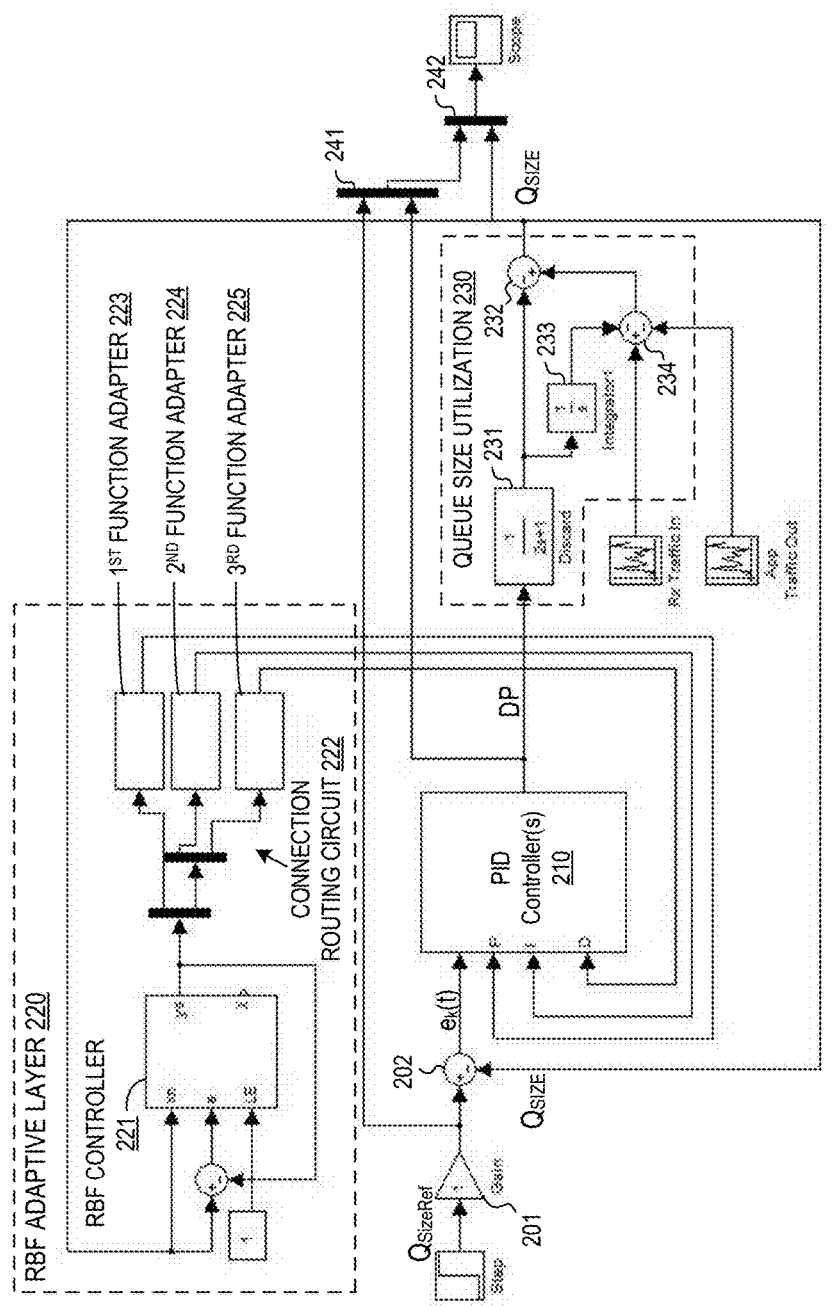
FIG. 2 illustrates a schematic circuit block diagram block diagram of a RBF-PID AQM controller.

Turning now to FIG. 2, there is shown a simplified schematic block diagram of a data packet routing device 200 which was created using a MathWorks Simulink® graphical block diagramming tool to simulate the timing diagram results presented herein. As depicted, the data packet routing device 200 employs an RBF-PID AQM controller arrangement having a PID controller 210 connected to a RBF adaptive layer 220 which adjusts one or more gain parameters (e.g., P, I, and D) provided to the PID controller 210 for processing the error measure ($e_k(t)$) to generate therefrom a quantified discard probability (DP) output for controlling the queue size utilization circuit 230 which performs packet drop operations on the received incoming packet flow (Rx Traffic In). As depicted, the PID controller 210 is connected to receive an input error measure ($e_k(t)$) and one or more gain parameter input signals (P, I, D) from the RBF adaptive layer 220, and to generate therefrom a quantifiable discard probability (DP) measure, thereby providing an automatic queue size (Qsize) adjustment according to a configurable reference level (QsizeRef). To generate the error measure, a differential circuit 202 may be connected to receive the feedback queue size (Qsize) and a queue size setpoint or reference level (QsizeRef) that is amplified by the gain buffer 201, and to compute therefrom the error measure ($e_k(t)$) that is provided as an input to the PID controller 210.

The gain parameter input signals that are input to the PID controller 210 are provided by the RBF adaptive layer 220 which processes the received queue size (Qsize) at the RBF controller 221 to generate an approximation function ys for the nonlinear queue utilization. Rather than using the quantified DP measure as an input, the RBF controller 221 is connected in an error feedback correction circuit to receive an input measure e of the error between the received queue size (Qsize) and the estimated function ys. In an example embodiment, the RBF controller 221 generates the approximation function, $$f(x) = \sum_{i=1}^{n} w_i \phi_i(\|x - x_i\|),$$

for the nonlinear queue utilization, where $\phi$ is a function that depends only on distance from a set-point called origin or center (e.g., $\phi(x, c) = \phi(\|x-c\|)$), and where norm is Euclidean distance $$\|x - c\| = \sqrt{\sum_{i=1}^{n} (x_i - c_i)^2}.$$

Using the Gaussian function, $$\phi(x) = ae^{-\frac{(x-b)^2}{2c^2}} + d$$

and choosing a=1 and d=0 for simplicity, the function $$\phi(x) = e^{-\frac{(x-c)^2}{2b^2}},$$

resulting in the queue utilization approximation f(x) as a nonlinear system, $$f(x) = \sum_{i=1}^{n} w_i e^{-\frac{(x-c_i)^2}{2b_i^2}}.$$

Using one or more connection routing circuits 222, the queue utilization approximation f(x) is supplied to one or more function adaptation blocks 223-225, each of which may implement user-defined functions in software to generate the gain parameters P, I, and D. For example, a first function adaptation block 223 generates the proportional gain parameter:

$$\Delta K_p(k) = \eta e(k)(e(k) - e(k-1)) \sum_{i=1}^{m} w_i \phi_i(u(k)) \frac{u(k) - c_i}{b_i^2}.$$

In addition, a second function adaptation block 224 generates the integral gain parameter:

$$\Delta K_i(k) = \eta e(k)^2 \sum_{i=1}^{m} w_i \phi_i(u(k)) \frac{u(k) - c_i}{b_i^2}.$$

Finally, the third function adaptation block 225 generates the derivative gain parameter:

$$\Delta K_d(k) = \eta e(k)(e(k) - 2e(k-1) + e(k-2)) \sum_{i=1}^{m} w_i \phi_i(u(k)) \frac{u(k) - c_i}{b_i^2}.$$

In response to the error measure $e_k(t)$ and gain parameters P, I, and D, the PID controller 210 computes the discard probability (DP) measure for output to control the queue size utilization circuit 230 which performs packet drop or enqueue operations on the received incoming packet flow (Rx Traffic In). As depicted, PID controller 210 is connected to generate a DP measure which drives the discard computation unit 231 in the queue size utilization circuit 230. The queue size utilization circuit 230 is the mathematical model used to simulate the actual utilization of a receive queue existent in a real router, with the incoming traffic going into the Rx queue and with a routing application extracting traffic out from Rx queue for further processing of the received frames. In selected embodiments, the discard computation unit 231 is used to simulate the first stage of network dynamics as a first order linear system, which is output for connection to a first combination circuit module 232 and the integrator unit 233 which is used to eliminate the steady state error and compensate for traffic disturbances. At a second combination circuit module 234, the output from the integrator unit 233 and the App Traffic Out are subtracted from the received incoming packet flow to generate an output signal that is supplied as an input to the first combination circuit module 232 which generates the queue size (Qsize). As disclosed herein, the App Traffic Out signal simulates the application on the router which is extracting frames out of the queue in order to obtain a realistic simulation of the entire process, whereby frames are coming into the queue that received from the network, but frames are also extracted out from the queue by the router application itself in order to forward them to another port. Ultimately, the combination of all these blocks—first order system 231, integrator 232, random traffic in (Rx Traffic In), random traffic out (App Traffic Out)—is used to simulate the network dynamics behavior in a real scenario as a non-linear system. As illustrated, the generated signals are collected by the collector gates 241, 242 for capture and display by the scope.

As disclosed in the RBF-PID AQM controller arrangement for the data packet routing device 200, an active queue management algorithm for TCP networks is provided that can adapt to network delay and time-varying network parameters based on RBF-PID controller inputs from the RBF adaptive layer 220 to automatically tune the PID controller's parameters according to link capacity, traffic load, and transmitting time-delay that allow this algorithm to perform well for a wide-range of network conditions. However, such RBF-PID AQM controller arrangements nonetheless have some drawbacks in terms of settling time and overshoot, especially when there are larger errors between the reference level set point (QsizeRef) and adjustable queue size (Qsize). In the routing context, all of these drawbacks ultimately contribute to poor congestion management, reduced QoS, poor link throughput, and low network performance.

Figure 3:
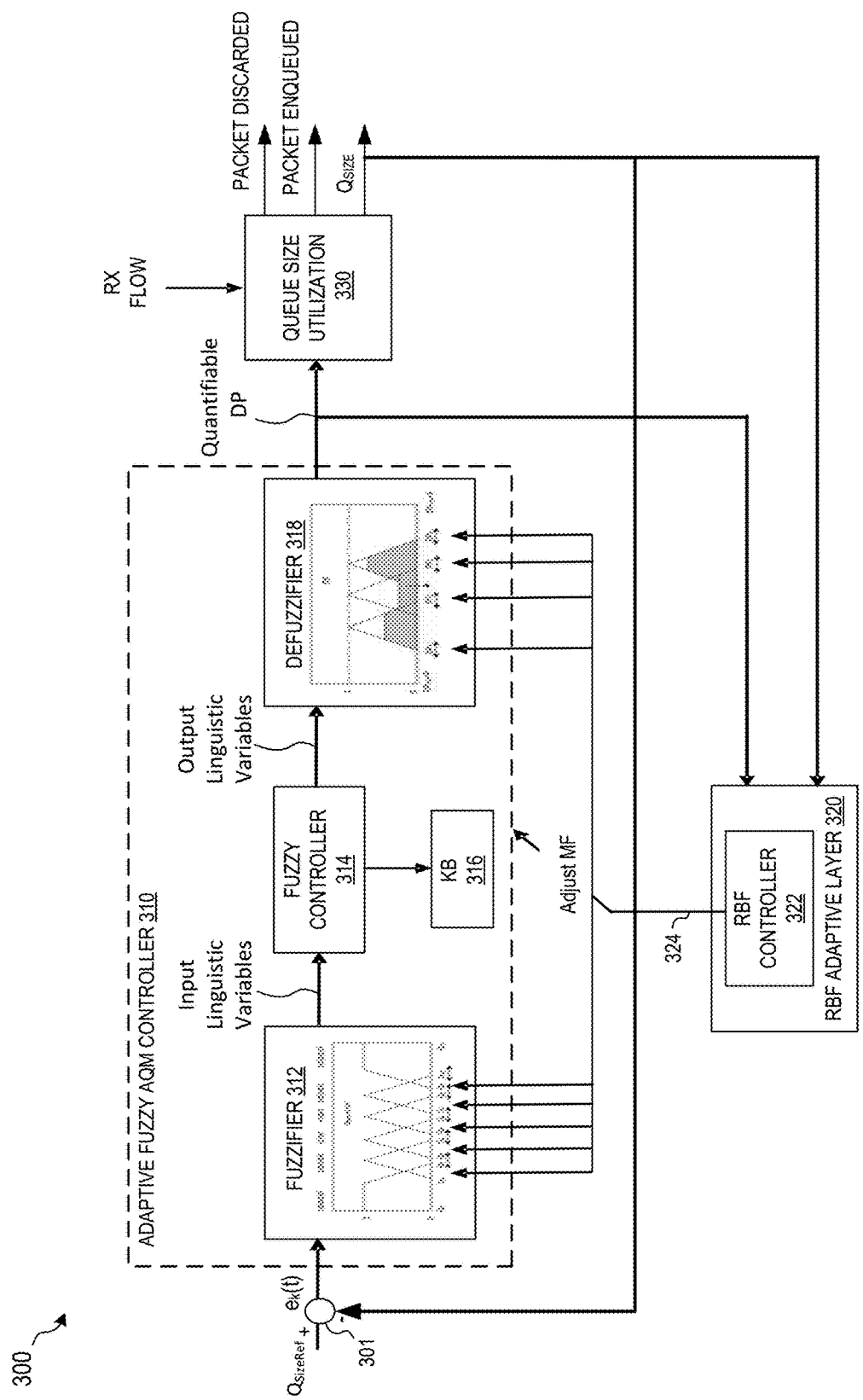
FIG. 3 illustrates a simplified architectural block diagram of an adaptive fuzzy AQM controller in accordance with selected embodiments of the present disclosure.

To address the drawbacks associated with conventional RBF-PID AQM controller arrangements and provide improved performance with reduced overshoot and quicker settling times, selected embodiments of the present disclosure provide an adaptive fuzzy AQM controller which employs an RBF adaptive layer to adjust the thresholds for membership functions and centroid calculations, thus transforming the simple fuzzy control into an adaptive fuzzy AQM controller. To provide additional details for an improved understanding of such adaptive fuzzy AQM controller embodiments, reference is now made to FIG. 3 which shows a simplified schematic block diagram of a data packet routing device 300 in accordance with a second illustrative embodiment which employs an adaptive fuzzy AQM controller 310 and RBF adaptive layer 320 to adapt the performance of the fuzzy controller 314 by adjusting the thresholds for membership function inputs to the fuzzifier unit 312 and defuzzifier unit 318 to manage network congestion by providing a discard probability (DP) measure to control the packet transmit/drop circuit 330 which performs packet drop operations on the received incoming packet flow (Rx Flow). As depicted, the adaptive fuzzy AQM controller 310 is connected to receive an input error measure ($e_k(t)$) and one or more threshold adjustment signals 324 from the RBF adaptive layer 320, and to generate therefrom a quantifiable DP measure by providing an automatic queue size (Qsize) adjustment according to a configurable reference level (QsizeRef). To generate the error measure, a differential circuit 301 may be connected to receive the feedback queue size (Qsize) and a queue size setpoint or reference level (QsizeRef), and to compute therefrom the error measure ($e_k(t)$) that is provided as an input to the adaptive fuzzy AQM controller 310. The threshold adjustment signal(s) 324 that are input to the adaptive fuzzy AQM controller 310 are provided by the RBF adaptive layer 320 which automatically adjusts the membership function (MF) values provided to the fuzzifier unit 312 and defuzzifier unit 318 in response to the received queue size (Qsize) and the quantifiable DP measure.

In contrast to classical PID controllers which are designed for linear systems, the adaptive fuzzy AQM controller 310 employs a fuzzy controller 314 which may be applied to non-linear systems because of their knowledge-based non-linear structural characteristics which can be used to model a decision making behavior. The input-output relationship of the fuzzy logic controller 310 may be expressed with a set of linguistic rules or relational expressions which are processed with a fuzzifier unit 312, a fuzzy controller 314, a rule or knowledge base 316, and a defuzzifier unit 318. The input error measure $e_k(t)$ is received as a crisp input at the fuzzifier unit 312. During the process of fuzzification by the fuzzifier unit 312, the input error measure is transformed into a fuzzy variable to generate input linguistic variables that are needed for the inference engine processing at the fuzzy controller 314. During fuzzification, one or more input membership functions may be retrieved from memory and/or provided by the RBF adaptive layer 320 which uses the RBF controller 322 to adjust the thresholds for membership functions and centroid calculation when defining the fuzzy sets for the input error measure (e.g., Lowest, Lower, Low, High, Higher, and Highest). In the knowledge base 316, a set of fuzzy control rules, which characterize the dynamic behavior of system, are defined. The fuzzy controller 314 uses these fuzzy control rules to form inferences and draw conclusions. The output linguistic variables generated by the fuzzy controller 314 are sent to the defuzzifier unit 318 which maps the space of fuzzy control actions into a quantifiable DP measure in the space of crisp control actions. During defuzzification, one or more output membership functions may be retrieved from memory and/or provided by the RBF adaptive layer 320 which uses the RBF controller 322 to adjust the thresholds for membership functions and centroid calculations when defining the crisp output values for quantifying the DP measure (e.g., DPmin, $DP_1$, $DP_2$, $DP_3$, $DP_4$, DPmax).

Using adjustment input controls 324 from the RBF adaptive layer 320, the adaptive fuzzy AQM controller 310 may be configured to approximate a mathematical model of the queue utilization for a router in a TCP communication network in order to adapt the parameters for the AQM (Active Queue Management) algorithm used to compute the packet Discard Probability measure for controlling the packet transmit/drop circuit 330 in order to identify discarded packets and enqueued packets, thereby maintaining an optimal utilization for router queues in unpredictable environment of TCP networks.

Figure 4:
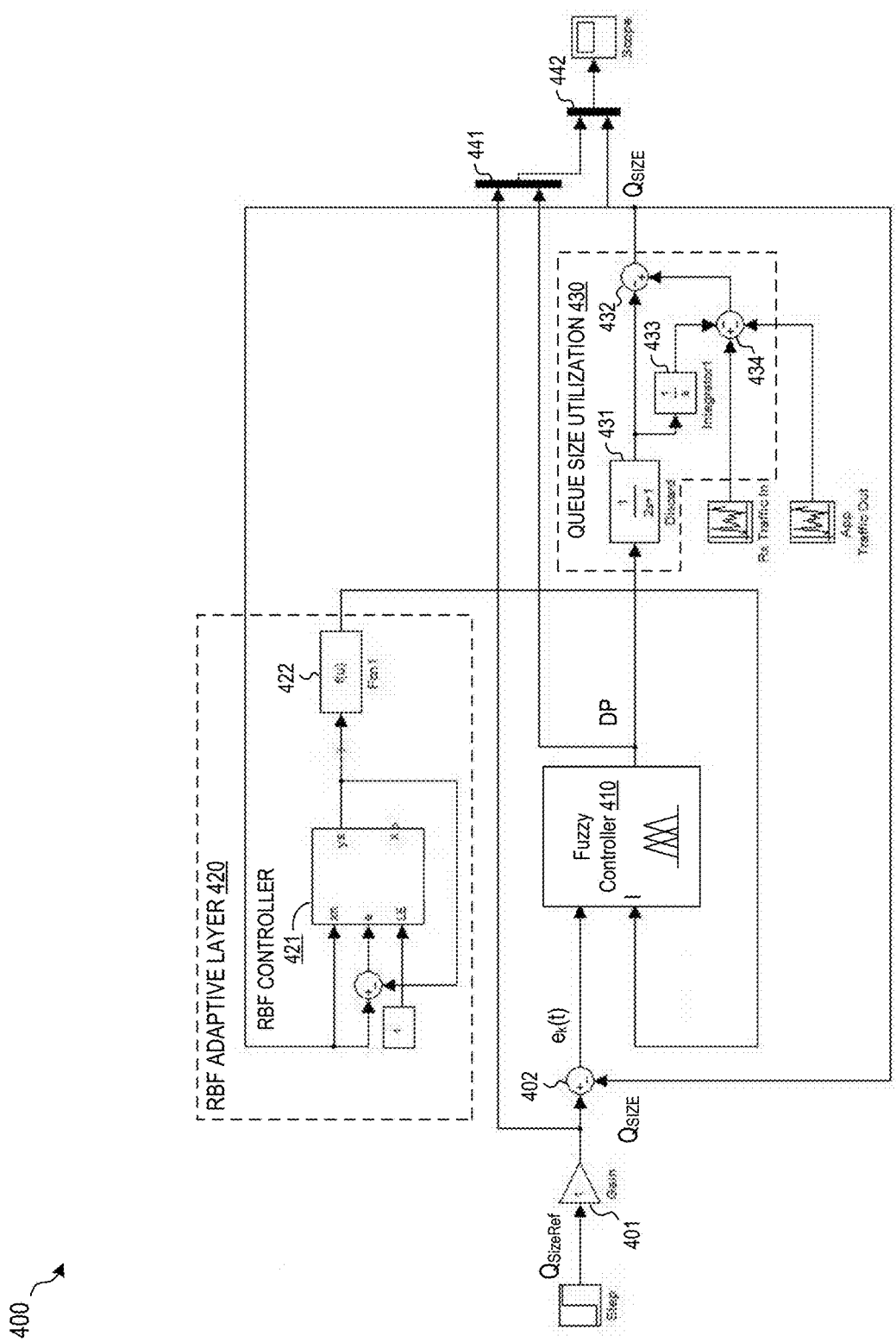
FIG. 4 illustrates a schematic circuit block diagram of a RBF-fuzzy AQM controller in accordance with selected embodiments of the present disclosure.

To provide additional details for an improved understanding of selected adaptive fuzzy AQM controller embodiments, reference is now made to FIG. 4 which illustrates a schematic block diagram of a data packet routing device 400 which was created using a Simulink graphical block diagramming tool to simulate the timing diagram results presented herein. As depicted, the data packet routing device 400 includes an RBF adaptive layer 420 connected to provide one or more input threshold parameters to a fuzzy controller 410. Using the input threshold parameter(s) (e.g., I) to adjust the membership functions, the fuzzy controller 410 is connected to receive an input error measure ($e_k(t)$) and one or more input threshold signals (e.g., I) from the RBF adaptive layer 420, and to generate therefrom a quantifiable discard probability (DP) measure for controlling the queue size utilization circuit 430 which performs packet drop operations on the received incoming packet flow (Rx Traffic In), thereby providing an automatic queue size (Qsize) adjustment according to a configurable reference level (QsizeRef).

To generate the input error measure ($e_k(t)$), a differential circuit 402 may be connected to receive the feedback queue size (Qsize) and a queue size setpoint or reference level (QsizeRef) that is amplified by the gain buffer 401. Subtracting the queue size (Qsize) from the queue reference level (QsizeRef), the differential circuit 402 computes the error measure ($e_k(t)$) that is provided as an input to the fuzzy controller 410.

The input threshold parameter(s) that are input to the fuzzy controller 410 are provided by the RBF adaptive layer 420 which processes the received queue size (Qsize) at the RBF controller 421 to generate an approximation function ys for the nonlinear queue utilization. Rather than using the quantified DP measure as an input, the RBF controller 421 is connected in an error feedback correction circuit to receive an input measure e of the error between the received queue size (Qsize) and the estimated function ys. In an example embodiment, the RBF controller 421 generates the queue utilization approximation f(x) as a nonlinear system, $$f(x) = \sum_{i=1}^{n} w_i e^{-\frac{(x-c_i)^2}{2b_i^2}},$$

as explained above. The queue utilization approximation f(x) is supplied to the function adaptation block 422 which may implement a user-defined adaptation function for the fuzzy controller in software to generate the input threshold parameter(s) for membership function (MF). For example, the function adaptation block 422 generates the input threshold parameter:

$$\Delta K_F(k) = \eta(e(k) - e_{Th})(e(k) - e(k-1)) \sum_{i=1}^{m} w_i \phi_i(u(k)) \frac{u(k) - c_i}{b_i^2}.$$

In response to the error measure $e_k(t)$ and input threshold parameter(s), the fuzzy controller 410 computes the discard probability (DP) measure for output to control the queue size utilization circuit 430 which performs packet drop or enqueue operations on the received incoming packet flow (Rx Traffic In). As depicted, fuzzy controller 410 is connected to generate a DP measure which drives the discard computation unit 431 in the queue size utilization circuit 430. This queue size utilization circuit is the mathematical model used to simulate the actual utilization of a receive queue existent in a real router, with the incoming traffic going into the Rx queue and with a routing application extracting traffic out from Rx queue for further processing of the received frames. In selected embodiments, the discard computation unit 431 is used to simulate the first stage of network dynamics as a first order linear system, which is output for connection to a first combination circuit module 432 and the integrator unit 433 which is used to eliminate the steady state error and compensate for traffic disturbances. At a second combination circuit module 434, the output from the integrator unit 433 and the App Traffic Out are subtracted from the received incoming packet flow to generate an output signal that is supplied as an input to the first combination circuit module 432 which generates the queue size (Qsize). Ultimately, the combination of all these blocks—first order system 431, integrator 433, random traffic in (Rx Traffic In), and random traffic out (App Traffic Out)—is used to simulate the network dynamics behavior in a real scenario as a non-linear system. As illustrated, the generated signals are collected by the collector gates 441, 442 for capture and display by the scope, with the queue size (Qsize) signal being fed back to the differential circuit 402 and the RBF adaptive layer 420. While the disclosed adaptive fuzzy AQM controller arrangement for the data packet routing device 400 provides an active queue management algorithm for TCP networks that can adapt to network delay and time-varying network parameters based on membership function adjustment inputs from the RBF adaptive layer 420, such adaptive fuzzy AQM controller arrangements nonetheless have some drawbacks in terms of settling time and overshoot in cases where there are smaller errors between the reference level set point (QsizeRef) and adjustable queue size (Qsize).

Figure 5:
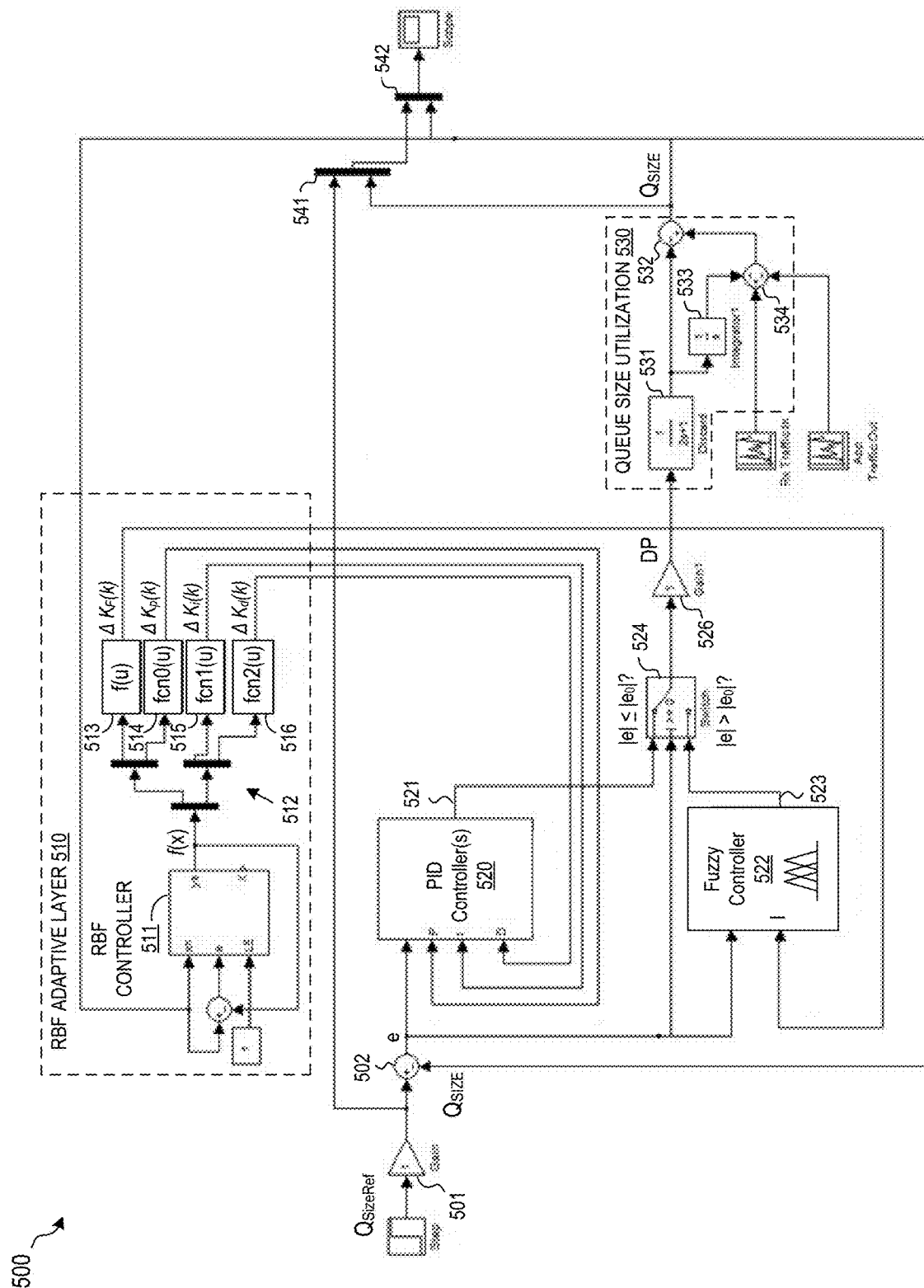
FIG. 5 illustrates a schematic circuit block diagram of a hybrid AQM controller having combined adaptive RBF-PID and RBF-fuzzy controllers in accordance with selected embodiments of the present disclosure.

To address these drawbacks and provide improved performance with reduced overshoot and quicker settling times, selected embodiments of the present disclosure provide a hybrid AQM controller and algorithm which uses RBF techniques to adapt and combine the advantages of fuzzy control logic (which is very suitable for nonlinear systems due to its knowledge base of nonlinear structural characteristics) and RBF-PID control logic (which has superior performance for controlling router congestion due to its adaptive ability to approximate nonlinear systems). To provide additional details for an improved understanding of such hybrid AQM controller embodiments, reference is now made to FIG. 5 which shows a simplified schematic block diagram of a data packet routing device 500 which was created using a Simulink graphical block diagramming tool to simulate the timing diagram results presented herein. As depicted, the data packet routing device 500 has an RBF adaptive layer 510 connected to provide control parameters to adapt the performance of an RBF-PID controller 520 and an adaptive fuzzy controller 522, each of which computes a discard probability (DP) measure 521, 523 that is selectively switched to control the queue size utilization circuit 530 which performs packet drop operations on the received incoming packet flow (Rx Traffic In) thereby managing network congestion by providing an automatic queue size (Qsize) adjustment according to a configurable reference level (QsizeRef).

As depicted, the PID controller 520 is connected to receive an input error measure ($e_k(t)$) and one or more gain parameter input signals (P, I, D) from the RBF adaptive layer 510, and to generate therefrom a first quantifiable discard probability (DP) measure 521. In addition, the fuzzy controller 522 is connected to receive an input error measure ($e_k(t)$) and one or more input threshold parameter(s) (e.g., I) from the RBF adaptive layer 510 which are used to adjust the membership function (MF) and centroid calculation values, and to generate therefrom a second quantifiable discard probability (DP) measure 523. To select between the DP outputs 521, 523, a selector circuit or switch 524 is connected to pass the second DP measure 523 as an output if an error threshold detection circuit determines that the error measure ($e_k(t)$) exceeds a threshold measure ($e_0$) (e.g., |e|<|$e_0$|). However, if the error measure ($e_k(t)$) does not meet or exceed the threshold measure (e.g., |e|≥|$e_0$|), then the selector circuit or switch 524 is connected to pass the first DP measure 521 as an output. In this configuration, the hybrid AQM controller 110 is configured to provide an automatic adjustment of the queue size (Qsize) that is close to the configurable reference level (QsizeRef) by adaptively selecting the PID controller 520 to implement a PID control law for small errors (e.g., |e|≤|$e_0$|), and to select the fuzzy controller 522 to implement a fuzzy control law for large errors (e.g., |e|>|$e_0$|).

To generate the error measure, a differential circuit 502 may be connected to subtract the feedback queue size (Qsize) from a configurable queue size setpoint or reference level (QsizeRef) that is amplified by the gain buffer 501, and to compute therefrom the error measure ($e_k(t)$) that is provided as an input to the PID and fuzzy controllers 520, 522. Additional control inputs to the PID and fuzzy controllers 520, 522 are provided by the RBF adaptive layer 510 which automatically adjusts input control values in response to the received queue size (Qsize).

To generate the control parameters signals that are provided by the RBF adaptive layer 510, a received queue size (Qsize) is processed by the RBF controller 511 at the controller input xn to generate an approximation function ys for the nonlinear queue utilization. Rather than using the quantified DP measure as an input, the RBF controller 511 is connected in an error feedback correction circuit to receive an input measure e of the error between the received queue size (Qsize) and the estimated function ys. In an example embodiment, the RBF controller 521 generates the queue utilization approximation f(x) as a nonlinear system, $$f(x) = \sum_{i=1}^{n} w_i e^{-\frac{(x-c_i)^2}{2b_i^2}},$$

as explained above.

Using one or more connection routing circuits 512, the queue utilization approximation f(x) is supplied to a plurality of function adaptation blocks 513-516, each of which may implement user-defined functions in software to generate the control parameters. For example, a first function adaptation block 513 generates the input threshold parameter f(u) that is the adaptation function for the fuzzy controller 522:

$$\Delta K_F(k) = \eta(e(k) - e_{Th})(e(k) - e(k-1))\sum_{i=1}^{m} w_i \phi_i(u(k)) \frac{u(k) - c_i}{b_i^2}.$$

In addition, a second function adaptation block 514 generates the proportional gain parameter fcn0(u) as an first adaptation function for the PID controller 520:

$$\Delta K_p(k) = \eta e(k)(e(k) - e(k-1))\sum_{i=1}^{m} w_i \phi_i(u(k)) \frac{u(k) - c_i}{b_i^2}.$$

In addition, a third function adaptation block 515 generates the integral gain parameter fcn1(u) as a second adaptation function for the PID controller 520:

$$\Delta K_i(k) = \eta e(k)^2 \sum_{i=1}^{m} w_i \phi_i(u(k)) \frac{u(k) - c_i}{b_i^2}.$$

Finally, a fourth function adaptation block 516 generates the derivative gain parameter fcn2(u) as a third adaptation function for the PID controller 520:

$$\Delta K_d(k) = \eta e(k)(e(k) - 2e(k-1) + e(k-2))\sum_{i=1}^{m} w_i \phi_i(u(k)) \frac{u(k) - c_i}{b_i^2}.$$

In response to the error measure $e_k(t)$ and supplied control parameters ($\Delta K_F(k)$, $\Delta K_P(k)$, $\Delta K_I(k)$, $\Delta K_D(k)$), PID and fuzzy controllers 520, 522 compute the DP outputs 521, 523 which are selectively connected by the selector circuit or switch 524 for input to control the queue size utilization circuit 530 which performs packet drop or enqueue operations on the received incoming packet flow (Rx Traffic In). In particular the selected DP output 521, 523 is connected by the switch 524 for input to the discard computation unit 531 in the queue size utilization circuit 530. This queue size utilization circuit is the mathematical model used to simulate the actual utilization of a receive queue existent in a real router, with the incoming traffic going into the Rx queue and with a routing application extracting traffic out from Rx queue for further processing of the received frames. In selected embodiments, the discard computation unit 531 is used to simulate the first stage of network dynamics as a first order linear system, which is output for connection to a first combination circuit module 532 and the integrator unit 533 which is used to eliminate the steady state error and compensate for traffic disturbances. At a second combination circuit module 534, the output from the integrator unit 533 and the App Traffic Out are subtracted from the received incoming packet flow to generate an output signal that is supplied as an input to the first combination circuit module 532 which generates the queue size (Qsize). Ultimately, the combination of all these blocks—first order system 531, integrator 533, random traffic in (Rx Traffic In), random traffic out (App Traffic Out)—is used to simulate the network dynamics behavior in a real scenario as a non-linear system.

Figure 6:
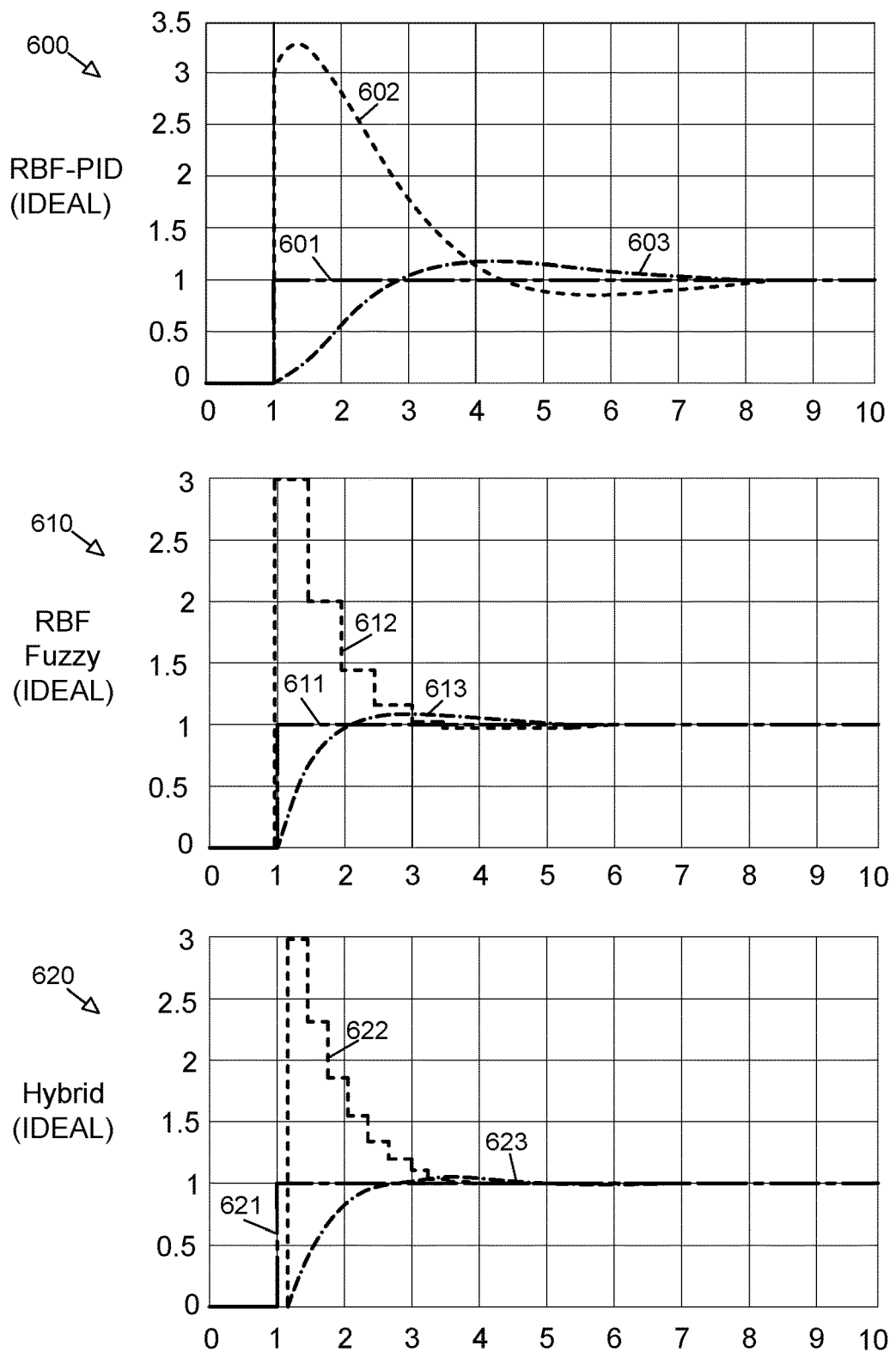
FIG. 6 illustrates a timing diagram comparison of simulated ideal test results for an RBF-PID controller, RBF-fuzzy controller, and hybrid AQM controller in accordance with selected embodiments of the present disclosure.

The relative performance of the RBF-PID AQM controller, RBG fuzzy controller, and hybrid AQM controller described hereinabove will be explained with reference to the timing diagrams 600, 610, 620 shown in FIG. 6 for comparing the simulated ideal test results for these controllers. For example, the first simulated timing diagram 600 for the RBF-PID AQM controller shows that, when the queue size setpoint (QsizeRef) is set to "1" (as shown with signal line 601) to represent a buffer threshold level (e.g., 90%), the discard probability (DP) measure (as shown with signal line 602) computed by the RBF-PID in the ideal scenario where packets are injected at a constant traffic rate will cause the computed queue size (Qsize) to have a very slow settling time (e.g., 7 milliseconds) and substantial overshoot (25%) of the queue size setpoint before settling back to the queue size setpoint (as shown with the signal line 603). In contrast, the second simulated timing diagram 610 for the RBF-fuzzy AQM controller shows that, when the queue size setpoint (QsizeRef) is set to "1" (as shown with signal line 611), the discard probability (DP) measure (as shown with signal line 612) computed by the RBF-fuzzy controller in the ideal scenario will cause the computed queue size (Qsize) to have a faster settling time (e.g., 5 milliseconds) with a reduced overshoot (20%) of the queue size setpoint to settle back to the queue size setpoint much more quickly (as shown with the signal line 613). Finally, the third simulated timing diagram 620 for the hybrid RBF-PID/fuzzy AQM controller shows that, when the queue size setpoint (QsizeRef) is set to "1" (as shown with signal line 621), the discard probability (DP) measure (as shown with signal line 622) computed in the ideal scenario will cause the computed queue size (Qsize) to have a relatively fast settling time (e.g., 5 milliseconds) with even less overshoot (10%) of the queue size setpoint and faster settling back to the queue size setpoint (as shown with the signal line 623). As seen from the foregoing, both the RBG fuzzy controller and hybrid AQM controller achieve improved performance in terms of settling time and overshoot in comparison to the RBF-PID AQM controller under ideal test conditions.

Figure 7:
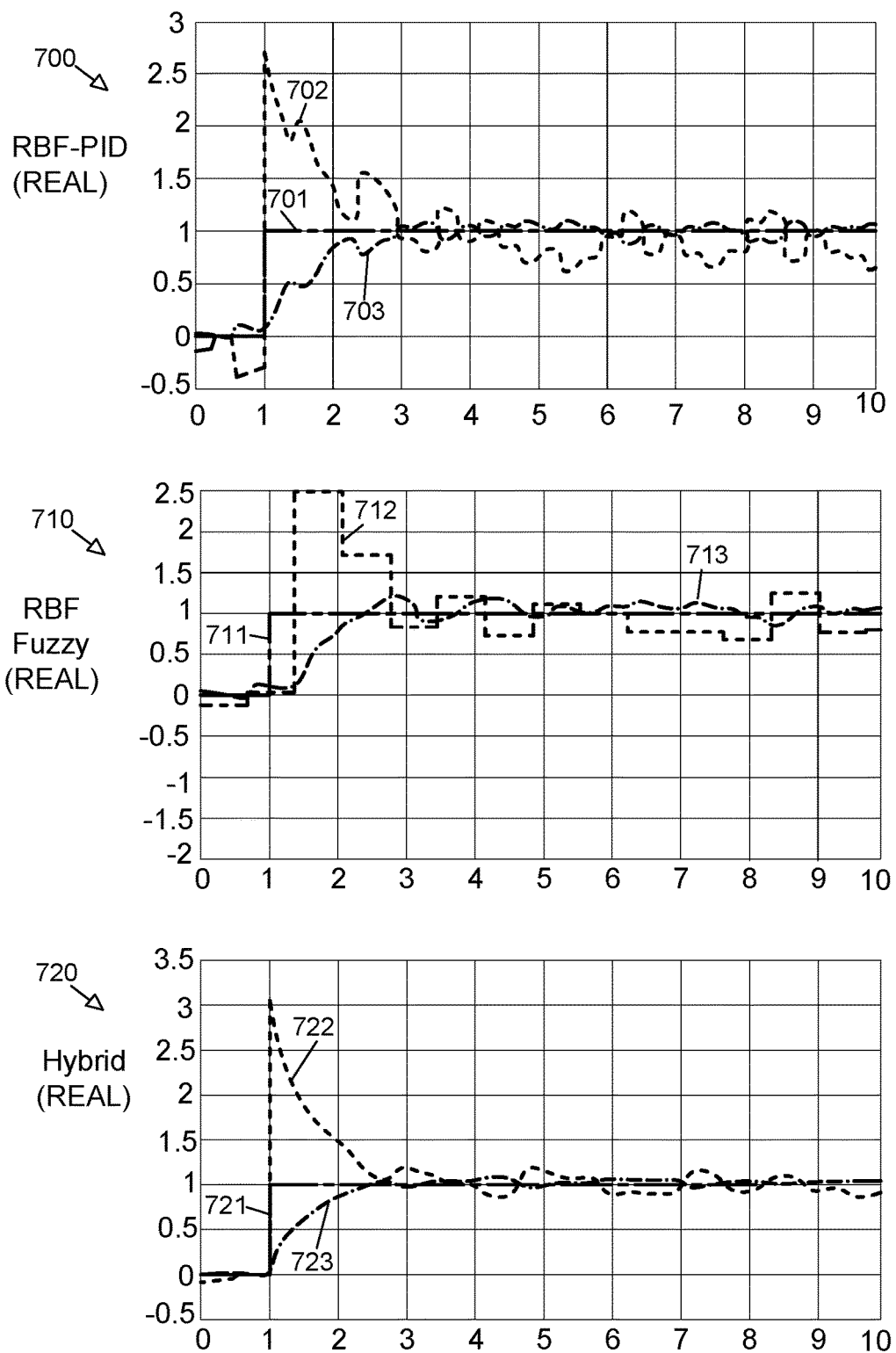
FIG. 7 illustrates a timing diagram comparison of simulated real world test results for an RBF-PID controller, RBF-fuzzy controller, and hybrid AQM controller in accordance with selected embodiments of the present disclosure.

These performance benefits are comparable, or even better, when real world test scenarios are applied, as shown in FIG. 7 which illustrates a comparison of timing diagrams for comparing the simulated real world test results for an RBF-PID controller 700, RBF-fuzzy controller 710, and hybrid AQM controller 720. In particular, the first simulated timing diagram 700 for the RBF-PID AQM controller shows that, when the queue size setpoint (QsizeRef) is set to "1" (as shown with signal line 701) to represent a buffer threshold level (e.g., 90%), the discard probability (DP) measure (as shown with signal line 702) computed by the RBF-PID in the real world scenario where packets are injected at a variable traffic rate will cause the computed queue size (Qsize) to have a very slow settling time (e.g., 8 milliseconds) and relatively significant, if erratic, overshoot (25%) of the queue size setpoint (as shown with the signal line 703). In contrast, the second simulated timing diagram 710 for the RBF-fuzzy AQM controller shows that, when the queue size setpoint (QsizeRef) is set to "1" (as shown with signal line 711), the discard probability (DP) measure (as shown with signal line 712) computed by the RBF-fuzzy controller in the real world scenario will cause the computed queue size (Qsize) to have a faster settling time (e.g., 7 milliseconds) with a similar overshoot (25%) of the queue size setpoint (as shown with the signal line 713). Finally, the third simulated timing diagram 720 for the hybrid RBF-PID/fuzzy AQM controller shows that, when the queue size setpoint (QsizeRef) is set to "1" (as shown with signal line 721), the discard probability (DP) measure (as shown with signal line 722) computed in the real world scenario will cause the computed queue size (Qsize) to have a relatively fast settling time (e.g., 6 milliseconds) with significantly less overshoot (9%) of the queue size setpoint and faster settling back to the queue size setpoint (as shown with the signal line 723). As seen from the foregoing, both the RBG fuzzy controller and hybrid AQM controller achieve improved performance in terms of settling time and overshoot in comparison to the RBF-PID AQM controller under real world test conditions.

Figure 8:
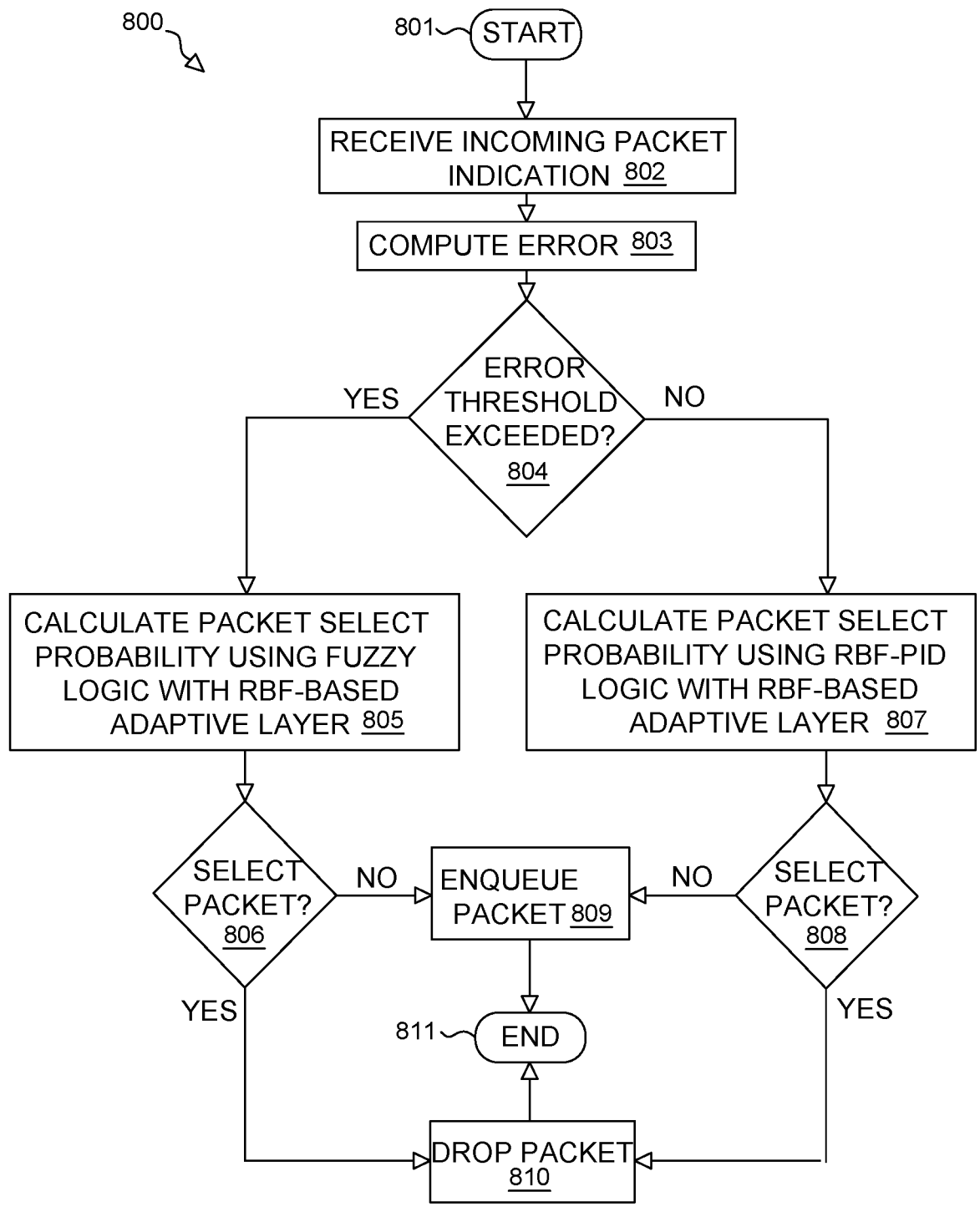
FIG. 8 illustrates a simplified flowchart showing the logic for controlling congestion in a communication network with a hybrid AQM controller in accordance with selected embodiments of the present disclosure.

Referring now to FIG. 8, there is shown a simplified flowchart diagram 800 showing the logic for controlling congestion in a communication network with a hybrid AQM controller within, say, a network router or the like, and in particular to a method of performing hybrid active queue management by using RBF to adapt PID gain parameters in a PID controller and fuzzy membership functions in a fuzzy controller for selective combination in deriving a packet select probability value for a data packet. When the method starts (801), an indication of an incoming data packet is received (step 802). Such an indication may comprise summary data about the incoming data packet, such as information identifying a target buffer etc. Alternatively, such an indication may comprise the data packet itself. Next, at step 803, a value is computed representing the error between the queue size setpoint (QsizeRef) and the computed queue size (Qsize). Having computed or otherwise determined the error measure at step 803, the method detects whether the determined error measure exceeds a specified error threshold at step 804.

If the determination is made at step 804 that the computed error measure exceeds the error threshold (affirmative outcome to step 804), then the method moves to step 805 where a packet select probability value for the received data packet is calculated using fuzzy logic to process at least the error measure computed at step 803. In selected embodiments, the packet select probability value computation at step 805 may use an RBF layer to adapt to the fuzzy membership function used by the fuzzy logic, where the term "packet select probability value" may be used to drop or discard a selected packet or to mark the selected packet (e.g., by way of a bit being set in the packet header) if supported by the underlying transport protocol (e.g., Explicit Congestion Notification (ECN)). Having derived the packet select probability value, the method moves to step 806 to determine whether the data packet is selected based on the packet select probability value. If the packet is not selected (negative outcome to detection step 806), then the received incoming packet is enqueued within the target buffer (at step 809), and the method ends (at step 811). Conversely, if the packet is selected (affirmative outcome to detection step 806), then the selected data packet dropped or discarded (at step 810), and the method ends (at step 811).

On the other hand, if the determination is made at step 804 that the computed error measure does not exceed the error threshold (negative outcome to step 804), then the method moves to step 807 where a packet select probability value for the received data packet is calculated using PID logic to process at least the error measure computed at step 803. In selected embodiments, the packet select probability value computation at step 807 may use an RBF layer to adapt to the PID gain parameters used by the PID logic. Having derived the packet select probability value, the method moves to step 808 to determine whether the data packet is selected based on the packet select probability value. If the packet is not selected (negative outcome to detection step 808), then the received incoming packet is enqueued within the target buffer (at step 809), and the method ends (at step 811). Conversely, if the packet is selected (affirmative outcome to detection step 808), then the selected data packet dropped or discarded (at step 810), and the method ends (at step 811).

By now it should be appreciated that there is provided herein a data packet routing device comprising at least one signal processing component, method and non-transitory computer program product having executable program code stored therein for deriving a packet select probability value for a data packet. In the disclosed data packet routing device, methodology and computer program product, a buffer size setpoint and a buffer size measure are determined for a target buffer of the data packet. In addition, a nonlinear model for buffer utilization is applied to at least a buffer size measure for the target buffer to generate at least a fuzzy membership function adjustment signal. In selected embodiments, the applied nonlinear model is a radial basis function which is applied to the buffer size measure to generate the fuzzy membership function adjustment signal for adjusting one or more membership function thresholds and a centroid calculation based on a predetermined mathematical model for buffer utilization. Once generated, the fuzzy membership function adjustment signal is supplied to a first controller (e.g., a fuzzy controller) to automatically tune membership function parameters of the first controller, where the first controller calculates a first packet select probability value for the data packet based at least partly on the fuzzy membership function adjustment signal and an error measure between the buffer size setpoint and the buffer size measure. In addition or in the alternative, the applied nonlinear model may generate one or more gain control adjustment signals that are supplied to a second controller (e.g., a PID controller) to automatically tune gain parameters of the second controller, where the second controller calculates a second packet select probability value for the data packet based at least partly on the one or more gain control adjustment signals and the error measure between the buffer size setpoint and the buffer size measure. In selected embodiments, the first controller is connected to supply the first packet select probability value to a queue size utilization circuit only when the error measure meets or exceeds a specified error threshold, and the second controller may be connected to supply the second packet select probability value to the queue size utilization circuit only when the error measure is below the specified error threshold.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are depicted with reference to simplified block diagrams and flow charts illustrating design and operational details of an adaptive hybrid control system with associated software modules and/or hardware devices for applying nonlinear models to adjust control parameters for one or more controllers without including every device feature or aspect in order to avoid limiting or obscuring the present invention. Such descriptions and representations are used by those skilled in the art to describe and convey the substance of their work to others skilled in the art, and the omitted details which are well known are not considered necessary to teach one skilled in the art of how to make or use the present invention. Some portions of the detailed descriptions provided herein are also presented in terms of algorithms and instructions that operate on data that is stored in a computer memory. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of hardware or a computer system or a similar electronic computing device, that manipulates and transforms data represented as physical (electronic) quantities within registers and memories into other data similarly represented as physical quantities within the memories or registers or other such information storage, transmission or display devices.

As identified above, the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems."

However, other modifications, variations and alternatives are also possible. The specifications and drawings are, accordingly, to be regarded in an illustrative rather than in a restrictive sense.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. In addition, the term "coupled," as used herein, is not intended to be limited to a direct coupling or a mechanical coupling. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for deriving a packet select probability value for a data packet for performing active queue management to reduce network congestion, comprising:
    determining a buffer size setpoint for a target buffer of the data packet;
    applying a nonlinear model for buffer utilization to at least a buffer size value for the target buffer to generate at least an adjustment signal for a fuzzy membership function; and
    supplying the adjustment signal to a first controller to automatically adjust thresholds for membership function inputs to the first controller, where the first controller calculates a first packet select probability value for the data packet based at least partly on the adjustment signal and an error measure derived from the buffer size setpoint and the buffer size value, wherein the adjustment signal automatically adjusts membership function values in response to the buffer size value and first packet select probability value.

2. The method of claim 1, where applying the nonlinear model for buffer utilization comprises applying a radial basis function to the buffer size value to generate the adjustment signal for adjusting one or more thresholds for membership function inputs based on a predetermined mathematical model for buffer utilization.

3. The method of claim 1, where the first controller is connected to supply the first packet select probability value to a queue size utilization circuit only when the error measure meets or exceeds a specified error threshold.

4. The method of claim 1, where the first controller comprises a fuzzy controller.

5. The method of claim 1, where applying the nonlinear model for buffer utilization further comprises generating one or more gain control adjustment signals.

6. The method of claim 5, further comprising supplying the one or more gain control adjustment signals to a second controller to automatically tune gain parameters of the second controller, where the second controller calculates a second packet select probability value for the data packet based at least partly on the one or more gain control adjustment signals and the error measure between the buffer size setpoint and the buffer size value.

7. The method of claim 6, where the second controller comprises a proportional-integral-derivative controller.

8. The method of claim 6, where the second controller is connected to supply the second packet select probability value to a queue size utilization circuit only when the error measure is below a specified error threshold.

9. A data packet routing device comprising at least one signal processing component arranged to derive a packet select probability value for a data packet, wherein the signal processing component is arranged to:
    apply a nonlinear model for buffer utilization to at least a buffer size value for a target buffer of the data packet to generate at least an adjustment signal for a fuzzy membership function;
    calculate an error measure derived from the buffer size value and a buffer size setpoint for the target buffer; and
    supply the adjustment signal to a first controller to automatically adjust thresholds for membership function inputs to the first controller, where the first controller calculates a first packet select probability value for the data packet based at least partly on the adjustment signal and the error measure, wherein the adjustment signal automatically adjusts membership function values in response to the buffer size value and first packet select probability value.

10. The data packet routing device of claim 9, where the signal processing component applies the nonlinear model for buffer utilization by applying a radial basis function to the buffer size value to generate the adjustment signal for adjusting one or more thresholds for membership function inputs based on a predetermined mathematical model for buffer utilization.

11. The data packet routing device of claim 9, where the first controller comprises a fuzzy controller that is connected to supply the first packet select probability value to a queue size utilization circuit only when the error measure meets or exceeds a specified error threshold.

12. The data packet routing device of claim 9, where the signal processing component is further arranged to:
    generate one or more gain control adjustment signals; and
    supply the one or more gain control adjustment signals to a second controller to automatically adjust gain parameters of the second controller, where the second controller calculates a second packet select probability value for the data packet based at least partly on the one or more gain control adjustment signals and the error measure between the buffer size setpoint and the buffer size value.

13. The data packet routing device of claim 9, where the second controller comprises a proportional-integral-derivative controller that is connected to supply the second packet select probability value to a queue size utilization circuit only when a error measure is below the specified error threshold.

14. A non-transitory computer program product having executable program code stored therein for deriving a packet select probability value for a data packet, the program code operable for:
  determining a buffer size setpoint for a target buffer of the data packet;
  applying a nonlinear model for buffer utilization to at least a buffer size value for the target buffer to generate at least an adjustment signal for a fuzzy membership function; and
  supplying the adjustment signal to a first controller to automatically adjust thresholds for membership function inputs to the first controller, where the first controller calculates a first packet select probability value for the data packet based at least partly on the adjustment signal and an error measure derived from the buffer size setpoint and the buffer size value, wherein the adjustment signal automatically adjusts membership function values in response to the buffer size value and first packet select probability value.

15. The non-transitory computer program product of claim 14, wherein the program code is operable to apply the nonlinear model for buffer utilization by applying a radial basis function to the buffer size value to generate the adjustment signal for adjusting one or more thresholds for membership function inputs based on a predetermined mathematical model for buffer utilization.

16. The non-transitory computer program product of claim 14, wherein the first controller comprises a fuzzy controller that is connected to supply the first packet select probability value to a queue size utilization circuit only when the error measure meets or exceeds a specified error threshold.

17. The non-transitory computer program product of claim 14, wherein the program code is operable for applying the nonlinear model for buffer utilization further comprises generating one or more gain control adjustment signals.

18. The non-transitory computer program product of claim 17, wherein the program code is operable for supplying the one or more gain control adjustment signals to a second controller to automatically tune gain parameters of the second controller, where the second controller calculates a second packet select probability value for the data packet based at least partly on the one or more gain control adjustment signals and the error measure between the buffer size setpoint and the buffer size value.

19. The non-transitory computer program product of claim 18, wherein the second controller comprises a proportional-integral-derivative controller.

20. The non-transitory computer program product of claim 18, where the second controller is connected to supply the second packet select probability value to a queue size utilization circuit only when the error measure is below a specified error threshold.

* * * * *